United States Patent [19]
Dewhirst

[11] 3,959,740
[45] May 25, 1976

[54] QUARTZ WEDGE POLARIZER FOR AN ELECTRO OPTIC SWITCH

[75] Inventor: Donald R. Dewhirst, Torrance, Calif.

[73] Assignee: The United States of America as represented by the Secretary of the Air Force, Washington, D.C.

[22] Filed: Feb. 6, 1975

[21] Appl. No.: 547,663

[52] U.S. Cl. .......................................... 331/94.5 Q
[51] Int. Cl.² .......................................... H01S 3/11
[58] Field of Search ..................... 331/94.5; 350/160

[56] References Cited
UNITED STATES PATENTS
3,437,951   4/1969   Dailey ........................... 331/94.5 M Primary Examiner—William L. Sikes
Attorney, Agent, or Firm—Joseph E. Rusz; George Fine

[57] ABSTRACT

A configuration of a pair of crystalline quartz wedges utilized as polarizers is combined with an electro optic switch to constitute a laser Q-switch. The two wedges are identical and are positioned on either side of the switch and oriented such that one compensates the angular deviation and dispersion of the other.

3 Claims, 2 Drawing Figures

QUARTZ WEDGE POLARIZER FOR AN ELECTRO OPTIC SWITCH

STATEMENT OF GOVERNMENT INTEREST

The invention described herein may be manufactured and used by or for the Government for governmental purposes without the payment of any royalty thereon.

BACKGROUND OF THE INVENTION

In one of the prior art devices, the electro optic switch operates in the ½ λ mode with a Glan-Taylor polarizer on the left and rochon polarizer on the right. The 100 percent reflecting mirror is a porro prism which is retroreflective about one axis. The Glan-Taylor polarizer reflects the horizontal polarization to one side of the polarizer and passes the vertical polarization. The Glan-Taylor polarizer is calcite to achieve separation of the two polarizations. The rochon polarizer separates the two polarizations angularly passing the vertical polarization undeviated and deviating the horizontal polarization to one side. The retroreflective property of the porro prism requires that the two polarizations from the rochon polarizer be separated a minimum of one-half beam diameter at the porro prism. Calcite is also required for the rochon polarizer to achieve the necessary angular separation.

Procurement of polarizers for some prior art electro optic switches including the aforementioned device are a considerable problem because they are not readily available and are often poor in quality.

The principal advantage of the wedge polarizer configuration is that it does not require calcite, as in some of the prior art devices, for the polarizing material, since a large angular separation of the two polarizations is not required. The reason for this is that both wedges deviate the two polarizations angularly about the same axis. This permits the electro optic switch to be oriented with a porro prism such that in the off condition, both polarizations are misaligned angularly with the porro prism.

The quartz wedges are considerably less expensive and are more easily mounted and aligned in the laser. Quartz is also a more durable material than calcite and is not as easily damaged by the laser beam.

SUMMARY OF THE INVENTION

An electro optic switch including quartz wedge polarizers is provided. A pair of crystalline quartz wedges are used as polarizers in combination with an electro optic switch constituting a new type of laser Q-switch. The two wedges are identical and are positioned on either side of the switch and oriented such that one compensates the angular deviation and dispersion of the other.

The electro-optic Q-switch uses the quartz wedges so that the optic axis is oriented parallel to the apex. Double refraction provides an angular separation of the horizontal and vertical polarizations. Although th angular separation is small for quartz, this particular polarization configuration does not require a large separation. The quartz wedge, in one application, used a wedge angle 12.5° yielding an angular separation of about 2 milliradians at 1.06 microns.

DETAILED DESCRIPTION OF THE PREFERRED EMBODIMENT

Figure 2:
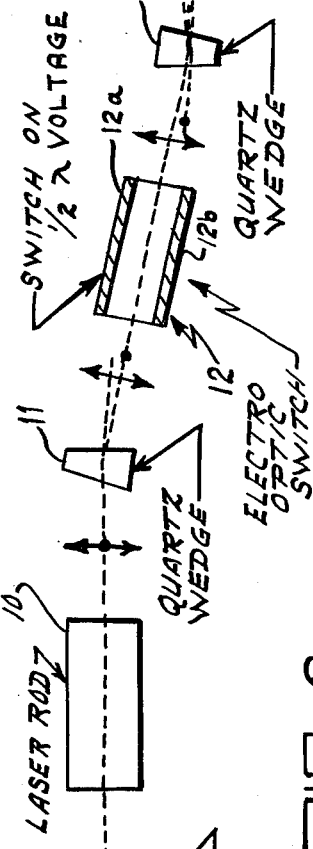
FIG. 2 illustrates in block diagram form the electro optic Q-switch using quartz wedge polarizers and shows the optical path and alignment with the laser mirrors for each polarization in the on condition of the switch.

FIG. 2 shows a configuration of a pair of crystalline quartz wedges 11 and 13 used as polarizers which are used in combination with electro optic switch 12 to constitute a new type of laser Q-swtich. Wedges 11 and 13 are identical and are positioned on either side of electro optic switch 12 such that one compensates the angular deviation and dispersion of the other.

It is emphasized that the polarizers for the laser Q-switch are crystalline quartz wedges 11 and 13 in which the optic axis is oriented parallel to the apex. Double refraction provides an angular separation of the horizontal and vertical polarizations. Although the angular separation is small for quartz, the particular polarizer configuration which is the subject of this invention does not require a large separation. Quartz wedges 11 and 13 in this embodiment used a wedge angle of 12.5° yielding an angular separation of about 2 milliradians at 1.06 microns. Of course, other suitable wedge angles may be used.

The operation of the electro optic Q-switch using crystalline quartz wedges 11 and 13 is shown in FIG. 2. The mode of operation is one of several which can be employed. The switch as shown operates in the ½ λ mode with the laser mirrors aligned such that electro optic switch 12 is off for zero voltage and on for ½ λ voltage. During the pumping phase of the laser operation, electro optic switch 12 is off. Following the pumping phase, ½ λ voltage is applied to electrodes 12a and 12b of electro optic switch 12 turning it on and thus enabling generation of the laser pulse.

Figure 1:
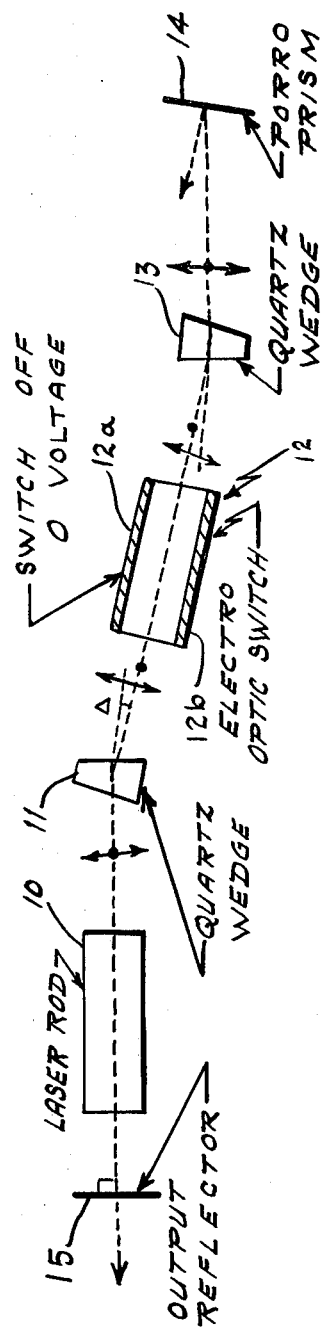
FIG. 1 illustrates in block diagram form the electro optic Q-switch using quartz wedge polarizers and shows the optical path of the horizontal and vertical polarizations and alignment with the front and rear laser mirrors for the off condition.

Now referring in detail to FIG. 1, there is shown the laser Q-switch which is comprised of laser rod 10, crystalline quartz wedge 11, conventional electro optic switch 12 having electrodes 12a and 12b, crystalline quartz wedge 13 fully reflecting porro prism 14 and output reflector 15. Laser rod 10 is suitably pumped by flash lamp or other means of excitation, and which is not shown in FIGS. 1 and 2. The laser rod 10 is contained in an optical cavity formed between porro prism 14 and output reflector 15.

It is noted that FIG. 1 shows the optical path of the horizontal and vertical polarizations and alignment with the front and rear laser mirrors for the off condition. With no voltage on electrodes 12a 12b of electro optic switch 12, the angular deviation through the wedges is equal and opposite for both polarizations. Therefore the net deviation of the optical path for each polarization is zero in passing through electro optic switch 12. THe mirrors are misaligned with both polarizations.

Now referring to FIG. 2, there is illustrated the identical numbered elements of FIG. 1, however it shows the optical path and alignment with the laser missors for each oplarization in the on condition of electro optic switch 12. This condition is obtained when ½ λ voltage is applied to electrodes 12a and 12b rotating both polarizations 90° in passing through the electro optic switch. If Δ is the angular separation of the two polarizations for each wedge polarizer, then the vertical polarization incident from the left is deviated upward by Δ and the horizontal polarization downward by Δ in passing left to right through the electro optic switch. The mirror alignment shown in FIG. 2 produces a horizontally polarized output laser beam. Alignment on the other polarization produces a vertically polarized output beam.

Another mode of operation utilizes the electro optic switch such that the switch is off for ½ λ voltage and on for zero voltage (i.e., physically parallel mirror alignment in FIGS. 1 and 2 with ½ λ voltage applied to the electro optic switch during the pumping phase and zero voltage to produce the Q-switched laser pulse). This produces an unpolarized Q-switched laser output beam. Operation of the Q-switch in this mode would be more efficient in a higher repetition rate laser in which the laser rod is stress-birefringent due to thermal gradients.

What is claimed is:

1. A laser Q-switch being comprised of an optical cavity having first and second laser mirrors and including therebetween, in the recited sequence, a laser medium for emitting a laser beam, a first crystalline quartz wedge having a preselected wedge angle utilized as a polarizer, an electro optic switch having a pair of electrodes, and a second crystalline quartz wedge identical to the first and also utilized as a polarizer, the crystalline wedges having the optic axis oriented parallel to the apex thus providing double refraction to obtain an angular separation of the horizontal and vertical polarizations.

2. A laser Q-switch as described in claim 1 wherein said first laser mirror is comprised of an output reflector and said second laser mirror of a fully reflecting porro prism and said first and second crystalline quartz wedges are positioned on either side of said electro optic switch such that one compensates the angular deviation and dispersion of the other.

3. A laser Q-switch as described in claim 1 including means to apply a voltage to said electro optic switch so that said electro optic switch operates in the ½ λ mode with said laser mirrors aligned such that said electro optic switch is in the off condition for zero voltage and in the on condition for ½ λ voltage, during the pumping phase of the laser operation said electro optic switch being in the off condition and following said pumping phase said ½ λ voltage being applied resulting in said electro optic switch being in the on condition and thus enabling generation of a laser pulse.

* * * * *